United States Patent [19]
Ahuja

[11] 4,091,435
[45] May 23, 1978

[54] TELEPHONE PROTECTOR MODULE HAVING HEAT COIL FIRED FLAG INDICATOR

[75] Inventor: Omprakash Ahuja, Long Island City, N.Y.

[73] Assignee: Porta Systems Corp., Syosset, N.Y.

[21] Appl. No.: 754,544

[22] Filed: Dec. 27, 1976

[51] Int. Cl.$^2$ ............................................ H02H 3/22
[52] U.S. Cl. .................................... 361/119; 337/244
[58] Field of Search ................ 361/119; 337/240, 244

[56] References Cited

U.S. PATENT DOCUMENTS

| | | | |
|---|---|---|---|
| 2,914,636 | 11/1959 | Kozacka | 337/244 |
| 3,879,696 | 4/1975 | Imajyo et al. | 337/244 |
| 3,947,730 | 3/1976 | DeLuca et al. | 361/119 X |

*Primary Examiner*—Harry E. Moose, Jr.
*Attorney, Agent, or Firm*—Charles E. Temko

[57] ABSTRACT

A telephone protector module is provided with indicating means actuated by the actuation of heat sensitive means within the module to provide a visual indication of such actuation externally of the module casing. The indicating means is in the form of an elongated member secured at one end thereof to a moving member of the heat sensitive means. The free end of the indicating member projects through an opening in the end of the casing element, and normally lies flush with the outer surface thereof. Upon actuation of the heat sensitive means, the free end extends outwardly of said surface to be immediately visible to service personnel.

1 Claim, 2 Drawing Figures

TELEPHONE PROTECTOR MODULE HAVING HEAT COIL FIRED FLAG INDICATOR

BACKGROUND OF THE INVENTION

Telephone protector modules have reached a state of very high development in the prior art. They serve the purpose of providing for the grounding of surges of excess voltage and current occurring in an individual telephone circuit, which current surges may be of either a momentary type, as occurring during a stroke of lightning which strikes the circuit, or of a substantially continuous type, as might be caused by a falling power line contacting the circuit. Most such devices include a heat sensitive means actuated by the presence of the latter type of surge, wherein one or both lines are placed in electrical communication with a grounding prong, in turn communicating with a source of ground potential. This actuation preferably bypasses the flow of excess current through an arcing device provided for grounding momentary surges of excess current, so as to avoid damage to the arcing device.

The protector devices are normally mounted upon a connector block mounting hundreds of such modules in juxtaposed relative locations. Upon the actuation of a heat sensitive device, to ground an excessive current, the circuit remains grounded (and the related subscribers remains without service) until the source of trouble is corrected, and the protector module is replaced.

In the past, the locating of a "blown" module included stroking contacts of many individual telephone lines on a telephone connector block using a probe connected to a volt meter, a laborious process, complicated by the fact that there are normally a large number of such contacts positioned as closely adjacent each other as possible. As it is usually impossible to label grounded circuits, the modules have to be replaced individually as they are identified.

SUMMARY OF THE INVENTION

Briefly stated, the invention contemplates the provision of an improved telephone protector module of the class described having provision for identifying the actuation of self-contained heat sensitive means. The last mentioned means is in the form of an elongated "flag" of color contrasting with that of the casing element of the module. One end of the flag is secured to a moving element of the heat sensitive means. The opposite end thereof is positioned within an opening in one end wall of the casing element, flush with the outer surface thereof, to project outwardly from said surface immediately upon movement of the moving element.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figure 1:
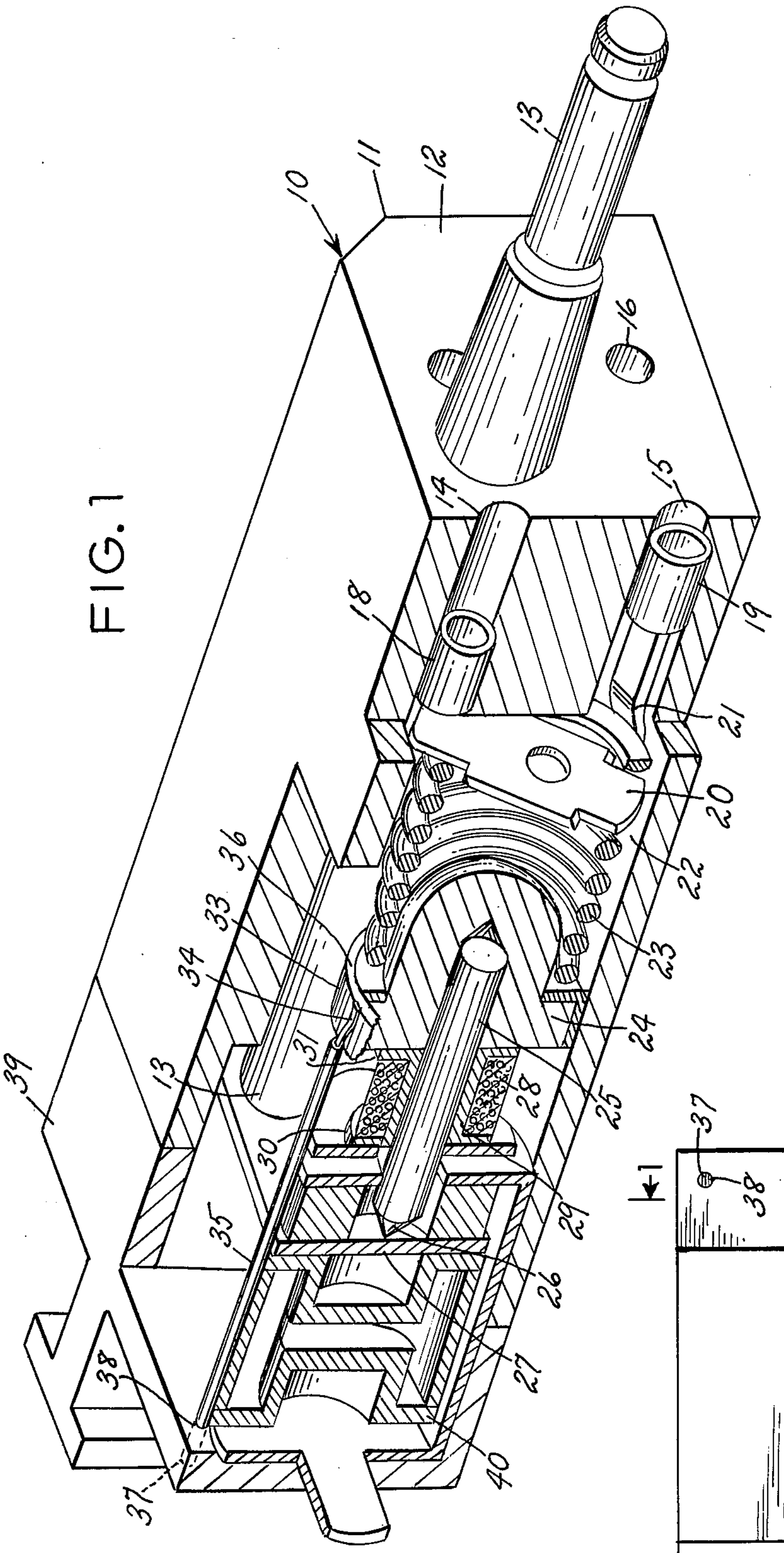
FIG. 1 is a longitudinal sectional view of a telephone connector module embodying the invention as seen from the plane 1—1 in FIG. 2.
Figure 2:
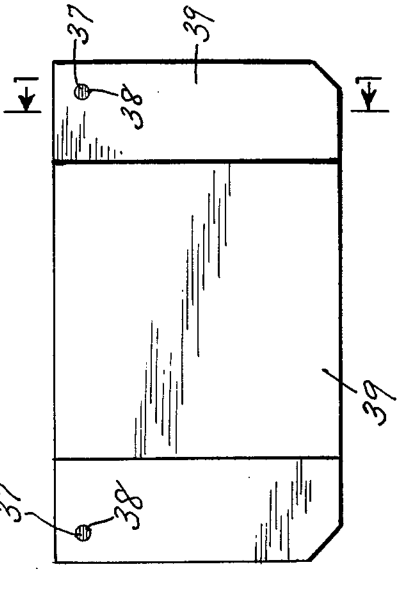
FIG. 2 is an end elevational view thereof.

In accordance with the invention, the device, generally indicated by reference character 10, includes a casing element 11, a first end 12 of which mounts a grounding prong or contact 13, and provides a plurality of bores 14, 15 and 16, the bores mounting contacts 18 and 19 of known type for communication with the so-called "tip" and "ring" circuits comprising an individual telephone subscriber line. The contacts 18 and 19 are interconnected by first and second connecting portions 20 and 21, which are disposed in an elongated recess 22. It is customary to employ a pair of heat sensitive means, one for the "tip" circuit, and the other for the "ring" circuit. Each includes a compressed coil spring 23 which bears upon a plunger element 24 having a central shaft 25, a free end 26 of which selectively contacts a ground plane 27 communicating with the prong 13, when the heat sensitive means is "fired." The heat coil 28 is wound about a hollow shaft 29 having end flanges 30 and 31, the central shaft 25 being lightly soldered to the inner surface of the hollow shaft 29 by a thin film (not shown) which readily melts under heat developed by a continued current surge. The plunger element 24 includes a metallic rim 33 upon which a soldered connection 34 interconnects a length 35 of fine wire at an inner end 36 thereof. The outer end 37 projects through a small bore 38 in a cover member 39 of the casing element.

The module may contain, in addition to the above described structure, an arcing device 40, illustrated as a gas tube, although if desired, the conventional carbon blocks may also be used.

From a consideration of FIG. 1, it will be apparent that when the heat sensitive structure is actuated, the spring 23 will push the plunger 24 leftwardly causing the outer end of the wire 35 to project outwardly of the cover member 39. Because the action of the heat sensitive means is not reversible, the activated condition remains observable until corrected by service personnel.

I wish it to be understood that I do not consider the invention limited to the precise details of structure shown and set forth in this specification, for obvious modifications will occur to those skilled in the art to which the invention pertains.

I claim:

1. In a telephone protector module including a casing element, a plurality of contacts for interconnection with an individual telephone subscriber line, and heat-sensitive means for grounding said individual line upon the occurrence of excessive current and/or voltage surges, said heat sensitive means including at least one component movable within said casing element upon actuation, the improvement comprising: means for indicating the actuation of said heat-sensitive element externally of said casing element, said means including an elongated length of wire having a colored insulative cover which contrasts with the color of said casing element, a first end of said wire being secured to said one component, and a second end of said wire projecting through an opening in said casing element; said second end lying normally flush with the outer surface of said element bordering said opening therein, and projecting outwardly of said surface upon actuation of said heat-sensitive means.

* * * * *